US006326764B1

(12) United States Patent
Virtudes

(10) Patent No.: US 6,326,764 B1
(45) Date of Patent: Dec. 4, 2001

(54) PORTABLE SOLAR-POWERED CD PLAYER AND ELECTRICAL GENERATOR

(76) Inventor: Clement Virtudes, 94-1080 Kepa Kepa St., Waipahu, HI (US) 96797

( * ) Notice: Subject to any disclaimer, the term of this patent is extended or adjusted under 35 U.S.C. 154(b) by 0 days.

(21) Appl. No.: 09/586,951

(22) Filed: Jun. 5, 2000

(51) Int. Cl.$^7$ .................................................. H02J 7/35
(52) U.S. Cl. ............................................ 320/101; 323/906
(58) Field of Search ............................. 320/101; 323/906, 323/299, 303; 429/96–100

(56) References Cited

U.S. PATENT DOCUMENTS

| 4,827,534 | 5/1989 | Haugen ...................................... 2/108 |
| 4,929,873 | 5/1990 | Summer ................................. 315/219 |
| 4,999,545 | 3/1991 | Summer ................................. 315/219 |
| 5,111,127 | 5/1992 | Johnson ................................. 320/101 |
| 5,460,123 | * 10/1995 | Kolz ...................................... 119/220 |
| 5,732,324 | * 3/1998 | Rieger, III ............................ 455/3.01 |
| 5,737,706 | 4/1998 | Seazholtz et al. ................... 455/466 |
| 5,814,906 | * 9/1998 | Spencer ................................. 307/150 |
| 5,889,384 | 3/1999 | Hayes et al. ......................... 320/108 |
| 5,929,597 | 7/1999 | Pfeifer et al. ........................ 320/107 |
| 5,986,437 | 11/1999 | Lee ....................................... 320/162 |
| 6,174,070 | * 1/2001 | Takamura et al. .................... 362/183 |

* cited by examiner

Primary Examiner—Peter S. Wong
Assistant Examiner—Lawrence Luk
(74) Attorney, Agent, or Firm—Michael I. Kroll

(57) ABSTRACT

The present invention 10 discloses a portable, self-contained CD player and radio 18 having a solar energy collection, conversion and storage system as a primary power source with a DC to AC inverter 46 that provides the present invention with the capability of powering AC dependent devices. The solar energy is collected by a solar panel 12 that is pivotably attached to the topside of the device and can be adjusted to an angle sufficient to maximize the suns rays. To further increase the potential power output of the present invention 10 remote solar panel arrays 72 having a telescoping adjustable tripod 78 can be connected to the device. The solar panels 72 are pivotably and rotatably affixed to the tripod 78 to allow precise adjustment for effective solar energy collection. The solar panel array 72 and tripod 78 can be broken down for transport and storage as a single unit and the solar panels are sequentially offset from the tripod to permit the panels to swing face-to-face into an evenly stacked position to maintain the portability of the present invention.

6 Claims, 13 Drawing Sheets

PORTABLE SOLAR-POWERED CD PLAYER AND ELECTRICAL GENERATOR

This application is subject to U.S. Disclosure Document Ser. No. 467395, filed Jan. 10, 2000 and please incorporate by reference all information is referenced provisional application into this instant application.

BACKGROUND OF THE INVENTION

1. Field of the Invention

The present invention relates generally to portable power supply systems and, more specifically, to a portable, self-contained solar powered CD player and electrical generator and that utilizes a top-mounted solar panel to collect solar energy and then converts that solar energy into electrical energy to be stored in a rechargeable battery or used to power accessory components that are integrated into the unit such as an AM/FM radio, lantern, CD player, etc. A DC to AC inverter and an AC outlet are included to allow for operation of an AC powered device that is plugged into the unit.

2. Description of the Prior Art

There are other portable power systems designed for generating electricity. Typical of these is U.S. Pat. No. 4,827,534 issued to Alvin E. Haugen on May 9, 1989.

Another patent was issued to Steven E. Summer on May 29, 1990 as U.S. Pat. No. 4,929,873. Yet another U.S. Pat. No. 4,999,545 was issued to Steven E. Summer on Mar. 12 1991 and still yet another was issued on May 5, 1992 to Woodward Johnson as U.S. Pat. No. 5,111,127.

Another patent was issued to John W. Seazholtz on Apr. 7 1998 as U.S. Pat. No. 5,737,706. Yet another U.S. Pat. No. 5,889,384 was issued to John J. Hayes et al. on Mar. 30, 1999. Another was issued to John Edward Pfeifer et al. on Jul. 27, 1999 as U.S. Pat. No. 5,929,597 and still yet another was issued on Nov. 16, 1999 to Chang-Hum Lee as U.S. Pat. 5,986,437.

U.S. Pat. No. 4,827,534

Inventor: Alvin E. Haugen

Issued: May 9, 1989

A vest garment to be worn by persons working out of doors and which has an array of photovoltaic cells mounted on the back panel thereof. The individual cells are connected in series relationship with one another across a pair of output terminals which are brought out through a belt attached along the waistband of the vest to an output jack. The voltage developed across the photocell array may then be used to charge rechargeable batteries suspended from the belt or, alternatively, they be coupled to an input jack of a power tool having a self-contained rechargeable battery whereby charging current is generated when the vest is being worn out of doors.

U.S. Pat. No. 4,929,873

Inventor: Steven E. Summer

Issued: May 29, 1990

A portable high pressure sodium lamp lighting system is mounted on a mobile cart, the cart carrying a mobile power supply in the form of an automotive type battery. The portable lighting system employs a standard high pressure sodium luminaire designed to be driven by 115 volt 60 cycle utility generated power. A DC to AC converter is employed which converts the DC battery supply to a 115 volt simulated 60 cycle supply. The AC characteristic is simulated by generating a quasi-square wave form which approximates a 60 cycle characteristic when driving the luminaire.

U.S. Pat. No. 4999,545

Inventor: Steven E. Summer

Issued: Mar. 12, 1991

A portable high pressure sodium lamp lighting system is mounted on a mobile cart, the cart carrying a mobile power supply in the form of a automotive type battery. The portable lighting system employs a standard high pressure sodium luminaire designed to be driven by 115 volt 60 cycle utility generated power. A DC to AC converter is employed which converts the DC battery supply to a 115 volt simulated 60 cycle supply. The AC characteristic is simulated by generating a quasi-square wave form which approximates a 60 cycle characteristic when driving the luminaire.

U.S. Pat. No. 5,111,127

Inventor: Woodward Johnson

Issued: May 5, 1992

A portable power supply having a rechargeable battery in a housing mounted on a portable frame. An inverter/converter unit, attached to the frame, is hardwired to the battery for conversion of DC power to AC power and for recharging the battery from an external AC source. Power distribution means are provided for distributing DC and AC Power. Photovoltaic panels are mounted to the frame for recharging the battery.

U.S. Pat. No. 5,737,706

Inventor: John W. Seazholtz et al.

Issued: Apr. 7, 1998

A portable radio telephone handset includes the capability of operating as a data transfer terminal as well as an analog cellular telephone subscriber station. Two modes of operation are available in the handset, and a analog cellular communication mode and a Cellular Digital Packet Data (CDPD) mode. A controlled processor in the handset is used to program the power supply to follow a prioritized, high efficiency operating cycle, preferably tracking CDPD active/sleep mode duty cycle. The power supply has the capability of providing 120 volts AC output for other communication systems. The availability of 120 volts output is programmed to track the functions of the CDPD operation and Advanced Mobile Phone Service (AMPS) operation.

U.S. Pat. No. Des. 5,889,384

Inventor: John J. Hayes et al.

Issued: Mar. 30 1999

A power supply device and system for providing power to a portable electronic device. A detachable device includes a rechargeable DC power source, a DC-to-AC inverter, and a primary transformer winding around a first core element. The portable electronic device includes multiple secondary transformer windings around a second core element. The detachable device cooperates with the portable electronic device so as to form a complete power supply circuit for providing AC and/or DC operating voltages to the portable electronic device.

U.S. Pat. No. 5,986,437

Inventor: Chang-Hum Lee

Issued: Nov. 16,1999

A Portable Power System configured to supply an appropriate voltage to an electrical device. The system includes a battery pack having at least one cell supplying a first direct current voltage, and an adapter. The adapter, which is electrically connected to the battery pack by an electrical cord, is configured to be mechanically connected to the device. The adapter also includes a DC to DC voltage converter supplying a second direct current voltage to the device, the second voltage being smaller than the first voltage but sufficient to permit the intended operation of the device.

While these portable power supply systems may be suitable for the purposes for which they were designed, they would not be as suitable for the purposes of the present invention, as hereinafter described.

SUMMARY OF THE PRESENT INVENTION

The present invention discloses a portable, self-contained CD player and radio having a solar energy collection, conversion and storage system as a primary power source with a DC to AC inverter that provides the present invention with the capability of powering AC dependent devices. The solar energy is collected by a solar panel that is pivotably attached to the topside of the device and can be adjusted to an angle sufficient to maximize the suns rays. To further increase the potential power output of the present invention remote solar panel arrays having a telescoping adjustable tripod can also be connected to the device. The solar panels are pivotably and rotatably affixed to the tripod to allow precise adjustment for effective solar energy collection. The solar panel array and tripod can be broken down for transport and storage as a single unit and the solar panels are sequentially offset from the tripod to permit the panels to swing face-to-face into an evenly stacked position to maintain the portability of the present invention.

A primary object of the present invention is to provide a self-contained, portable AM/FM radio and CD player having a solar energy collection and conversion system as the primary power source.

Another object of the present invention is to provide a portable, solar-powered CD player having a rechargeable battery that can store energy cultivated from the solar panel or energy obtained from an external source such as a 110 VAC outlet or a 9 VDC automobile lighter.

Yet another object of the present invention is to provide a portable, solar-powered CD player having a DC to AC inverter and an AC outlet to allow a user to operate an AC dependent device such as a television or a power tool.

Still yet another object of the present invention is to provide a portable, solar-powered CD player and electric generator capable of receiving input from remote solar panels to increase it's potential power output.

Yet another object of the present invention is to provide a portable, solar-powered CD player and electric generator having remote solar panels adjustably affixed to a telescoping tripod wherein the tripod and panel array are configured in a manner to be selectively set to differing heights and angles as needed for optimum operation and can be broken down as a single, compact unit for transport and storage.

Additional objects of the present invention will appear as the description proceeds.

The present invention overcomes the shortcomings of the prior art by providing a portable, self-contained CD player and radio having a solar energy collection, conversion and storage system as a primary power source with a DC to AC inverter that provides the present invention with the capability of powering AC dependent devices. The solar energy is collected by a solar panel that is pivotably attached to the topside of the device and can be adjusted to an angle sufficient to maximize the suns rays and to further increase the potential power output of the present invention remote solar panel arrays having a telescoping adjustable tripod can be connected to the device. The solar panels are pivotably and rotatably affixed to the tripod to allow precise adjustment for effective solar energy collection. The solar panel array and tripod can be broken down for transport and storage as a single unit and the solar panels are sequentially offset from the tripod to permit the panels to swing face-to-face into an evenly stacked position to maintain the portability of the present invention.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
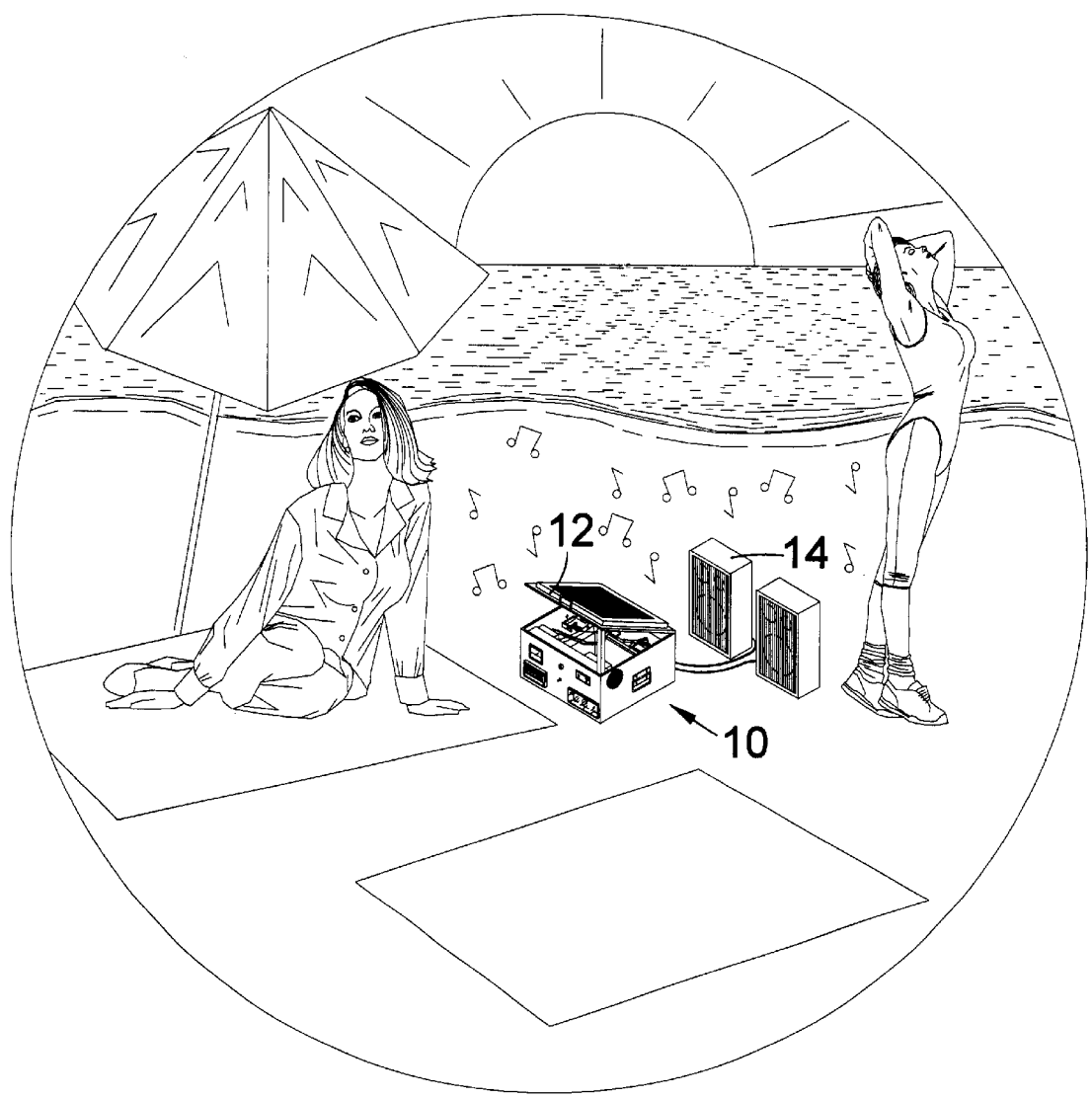
FIG. 1 is a perspective view of the present invention in use; shown is the portable, solar-powered CD player and electric generator with the solar panel raised at an angle to collect solar energy and converting that energy into electrical power to play the CD player through external speakers that are connected to the present invention.

With regard to reference numerals used, the following numbering is used throughout the drawings.
10 present invention
12 solar panel
14 external speaker
16 housing
18 CD player/radio
20 voltmeter
22 battery
24 battery terminals
26 lantern
28 AC outlet
30 toggle switch
32 front lighter plug
34 battery recharger
36 wiring harness
38 L brackets
40 rear lighter plugs
42 clamps
44 internal speaker
46 inverter
48 wall
50 handle
52 hinge
54 socket for external solar panel
56 socket for external AC power source
58 external speaker jacks
60 speaker wires
62 electrical wiring
64 external solar panel
66 stand
68 cord
70 AC power tool
72 remote solar array
74 support end
76 telescopic section
78 tripod
80 adjustable support
82 electrical connection
84 clamping device

DESCRIPTION OF THE PREFERRED EMBODIMENT(S)

In order that the invention may be more fully understood, it will now be described, by way of example, with reference to the accompanying drawings in which FIGS. 1 through 13 illustrate the present invention being a portable solar powered CD player and electrical generator.

Turning to FIG. 1, shown therein is a perspective view of the present invention 10 in use; shown is the portable, solar-powered CD player and electric generator 10 with the solar panel 12 raised at an angle to collect solar energy and converting that energy into electrical power to play the CD player through external speakers 14 that are connected to the present invention 10.

Figure 2:
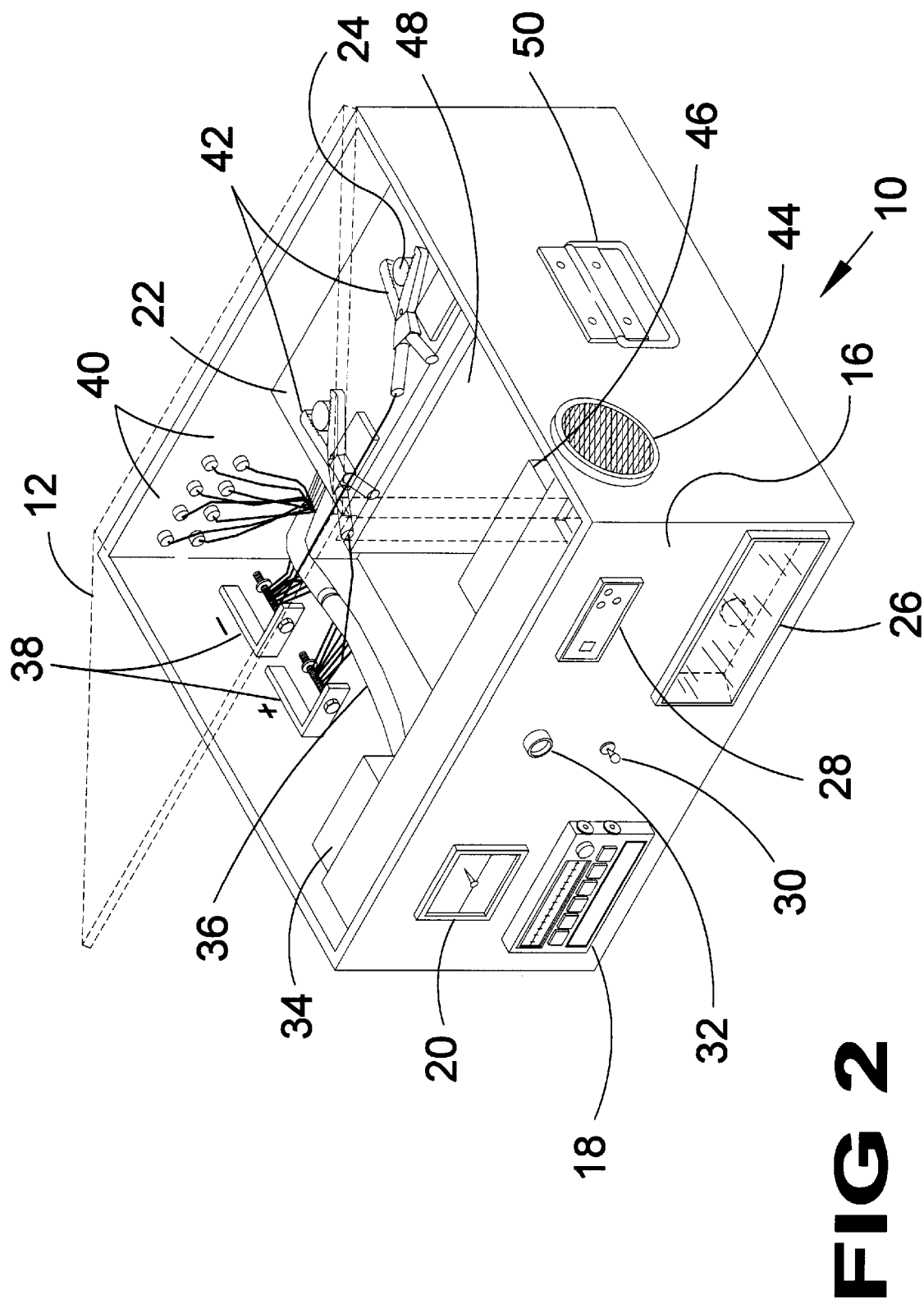
FIG. 2 is a perspective view of the present invention with the raised solar panel shown in hidden line. The front of the housing has a CD player/radio combo, a voltmeter that has leads wired to the positive and negative battery terminals to determine the differential and inform the user of the charge on the battery, a lantern, a three-prong 110 VAC outlet with ground fault interrupter for powering AC driven devices, a toggle switch, and a light plug.

Turning to FIG. 2, shown therein is a perspective view of the present invention 10 with the raised solar panel 12 shown in hidden line. The front of the housing 16 has a CD player/radio combo 18, a voltmeter 20 that has leads wired to the positive and negative battery 22 terminals 24 to determine the differential and inform the user of the charge on the battery 22, a lantern 26, a three-prong 110 VAC 28 outlet with ground fault interrupter for powering AC driven devices, a toggle switch 20, and a front lighter plug 32. Also shown is a battery recharger 34, wiring harness 36, positive and negative L brackets 38, eight rear lighter plugs 40, battery clamps 42, an internal speaker 44, voltage inverter 46, a divider wall 48 and carrying handle 50.

Figure 3:
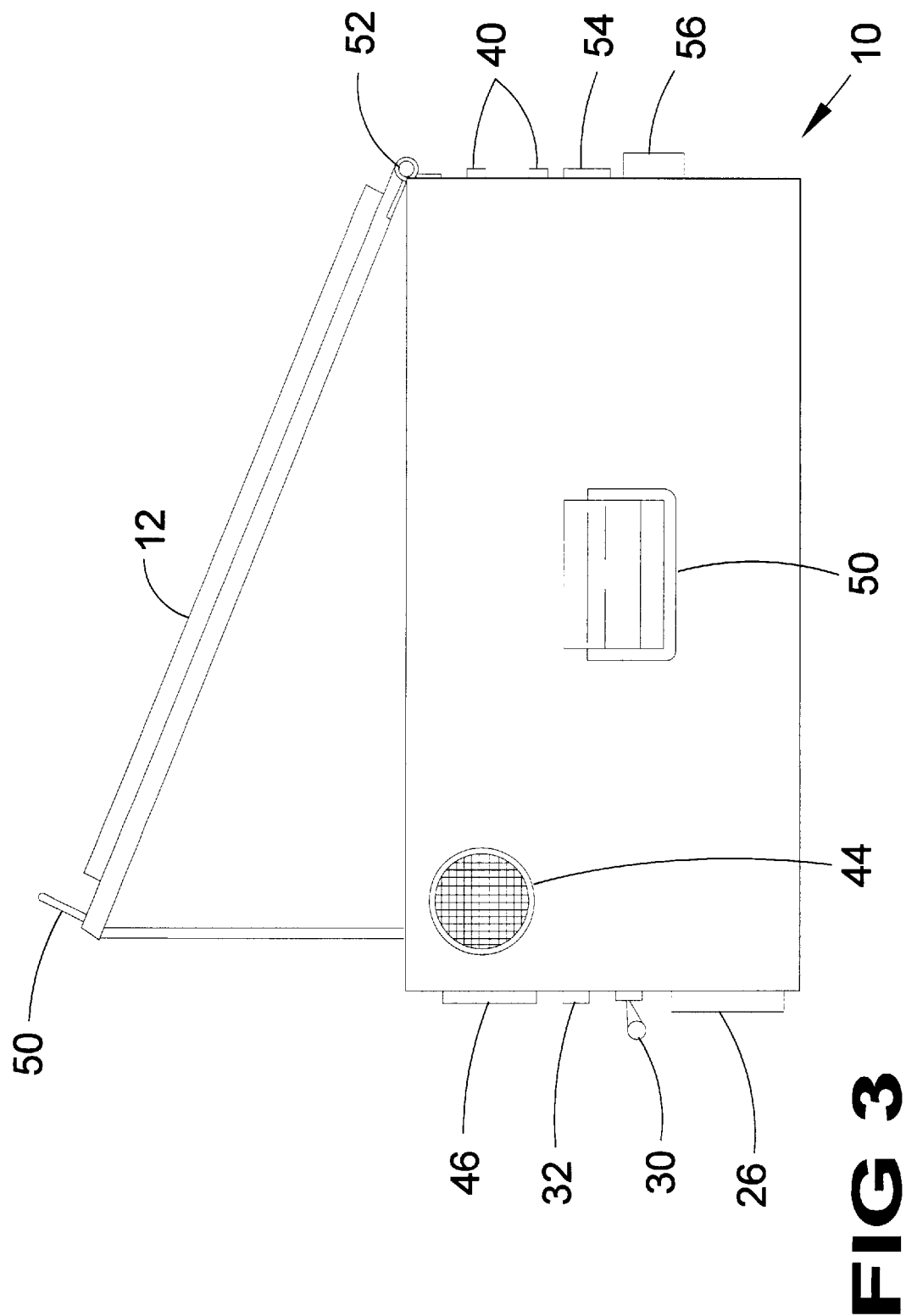
FIG. 3 is a side view of the present invention with the solar panel raised into position to collect solar energy. The present invention includes handles for easy transport and integrated speakers for the CD player/radio.

Turning to FIG. 3, shown therein is a side view of the present invention 10 with the solar panel 12 raised into position to collect solar energy. The present invention includes handles for easy transport and integrated speakers for the CD player/radio. Also shown are a pair of handles 50, a rear hinge 52 for the solar panel, a socket 54 for an external solar panel, a socket 56 for external AC power source. Other elements previously disclosed are also shown.

Figure 4:
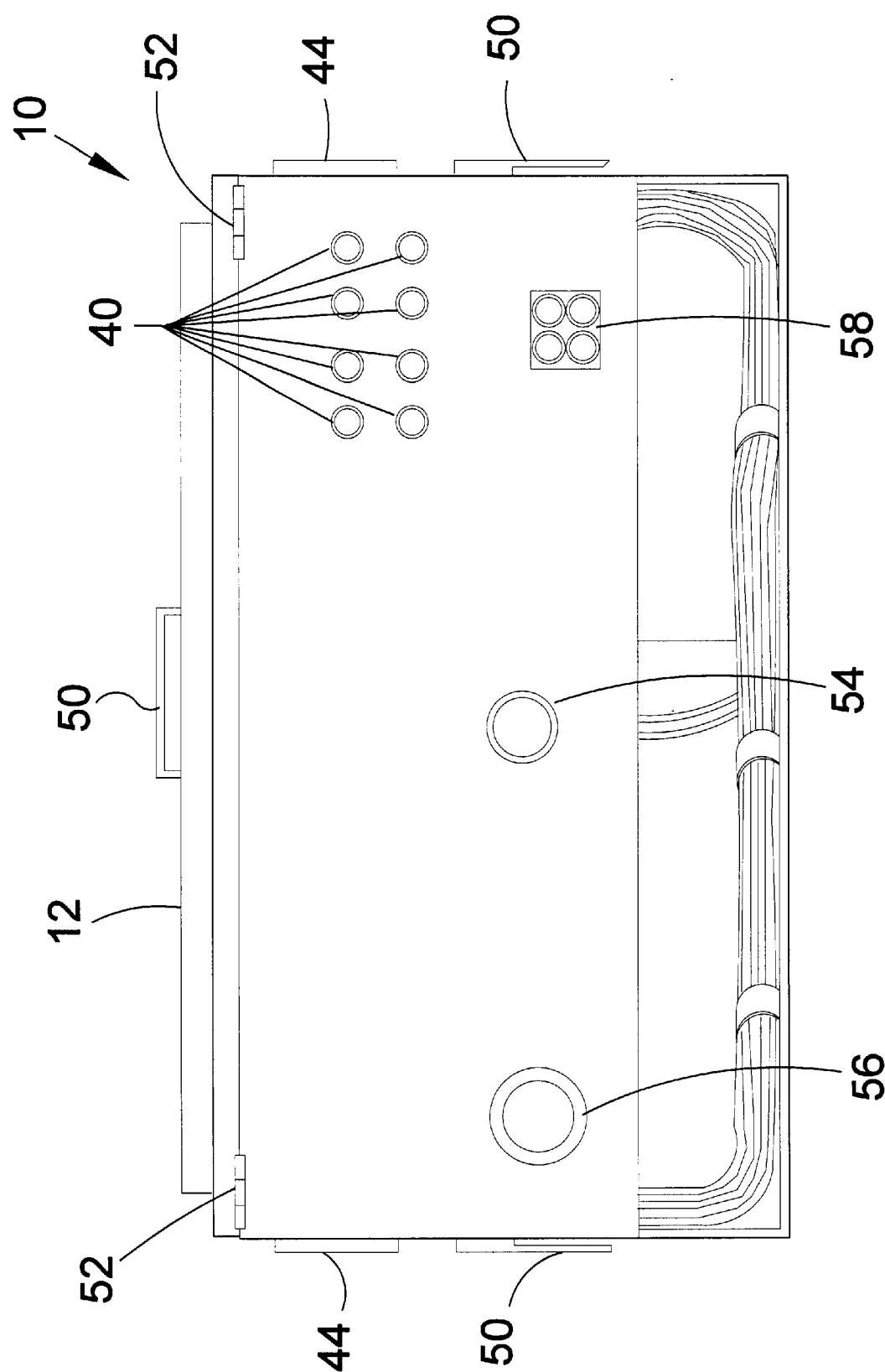
FIG. 4 is a rear view of the present invention with the solar panel in the closed position. Also shown are power input jacks for receiving power from remote solar arrays, an external 110 VAC source, 12V DC automobile lighters. Also shown are speaker output jacks for operating external speakers.

Turning to FIG. 4, shown therein is a rear view of the present invention 10 with the solar panel 12 in the closed position. Also shown are power input jacks for receiving power from remote solar arrays 54, an external 110 VAC source 56, and 12V DC automobile lighters 40. Also shown are speaker output jacks 58 for operating external speakers. Elements previously disclosed are also shown.

Figure 5:
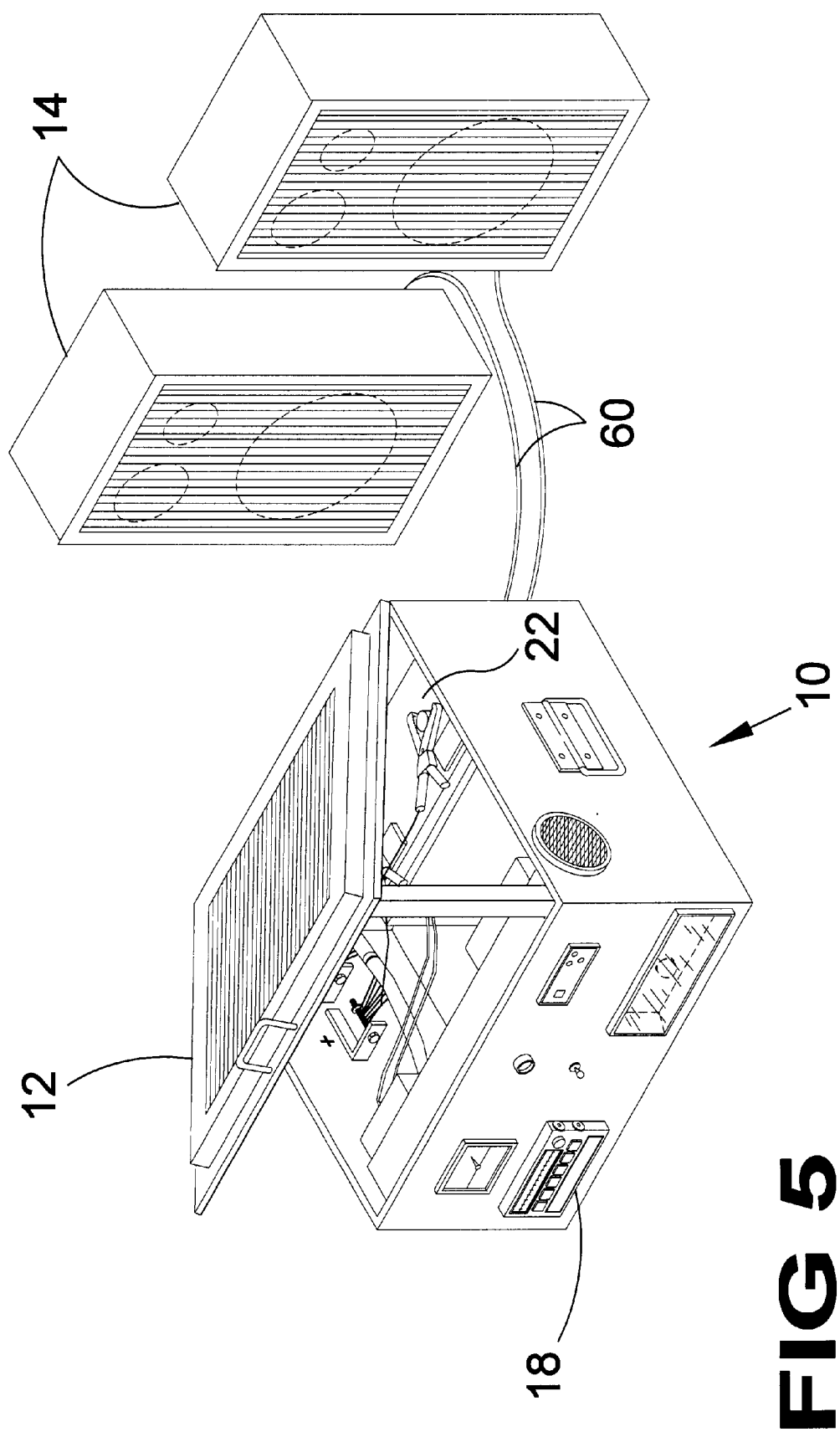
FIG. 5 is a perspective view of the present invention with external speakers attached and the solar panel in position for operation. The solar panel collects solar energy and converts it to electrical energy to operate the CD player or any other accessory components. Any electrical energy generated by the solar panel that exceeds what is needed to operate the accessory being used is then stored in a rechargeable battery for future use as is all of the electrical energy generated when no accessory components are being used.

Turning to FIG. 5, shown therein is a perspective view of the present invention 10 with external speakers 14 attached with speaker wires 60 and the solar panel 12 in position for operation. The solar panel 12 collects solar energy and converts it to electrical energy to operate the CD player 18 or any other accessory components. Any electrical energy generated by the solar panel 12 that exceeds what is needed to operate the accessory being used is then stored in a rechargeable battery 22 for future use, as is all of the electrical energy generated by the solar panel when no accessory components are being used.

Figure 6:
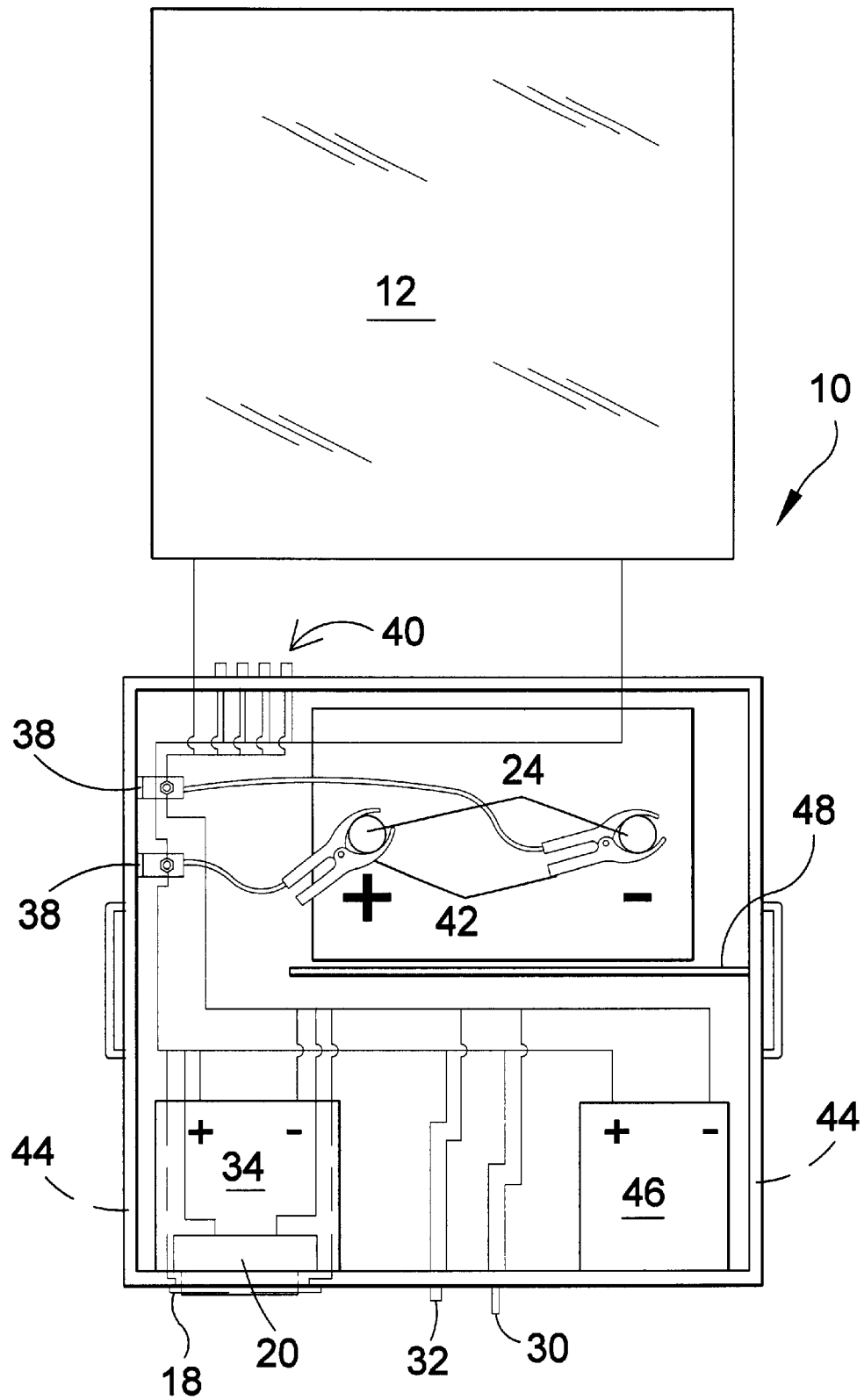
FIG. 6 is a top view schematic diagram of the present invention showing the wiring connections between the various components. Spring loaded clamps connect the circuit to the rechargeable battery terminals for fast and easy application and disconnection.

Turning to FIG. 6, shown therein is a top view schematic diagram of the present invention 10 showing the electrical wiring 62 connections between the various components. Spring loaded clamps 42 connect the circuit to the rechargeable battery terminals 24 for fast and easy application and disconnection. Other elements previously disclosed are also shown.

Figure 7:
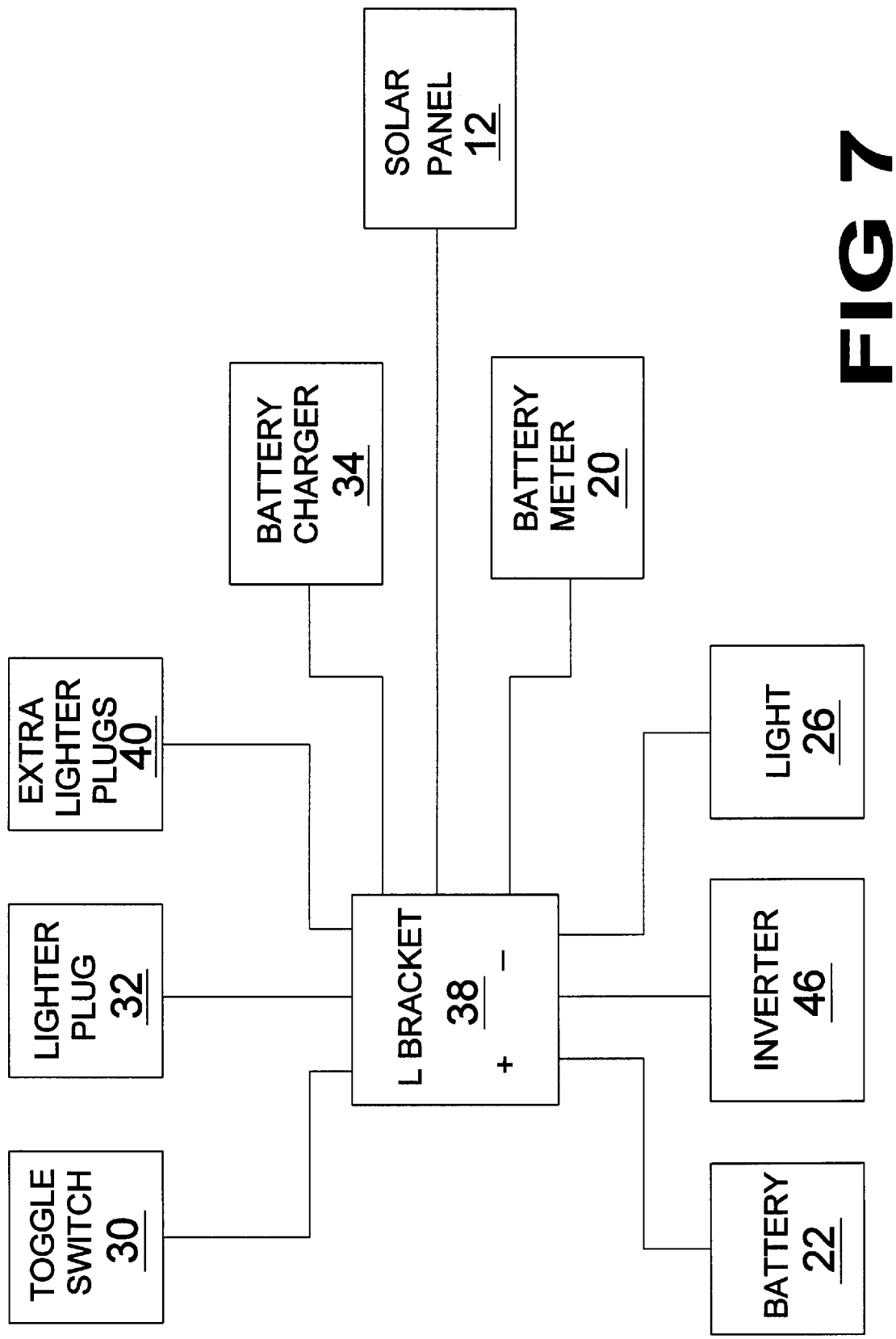
FIG. 7 is a block diagram of the present invention listing all of the major components and showing the inter-relationship between them.

Turning to FIG. 7, shown therein is a block diagram of the present invention listing all of the previously described major components and showing the inter-relationship between them.

Figure 8:
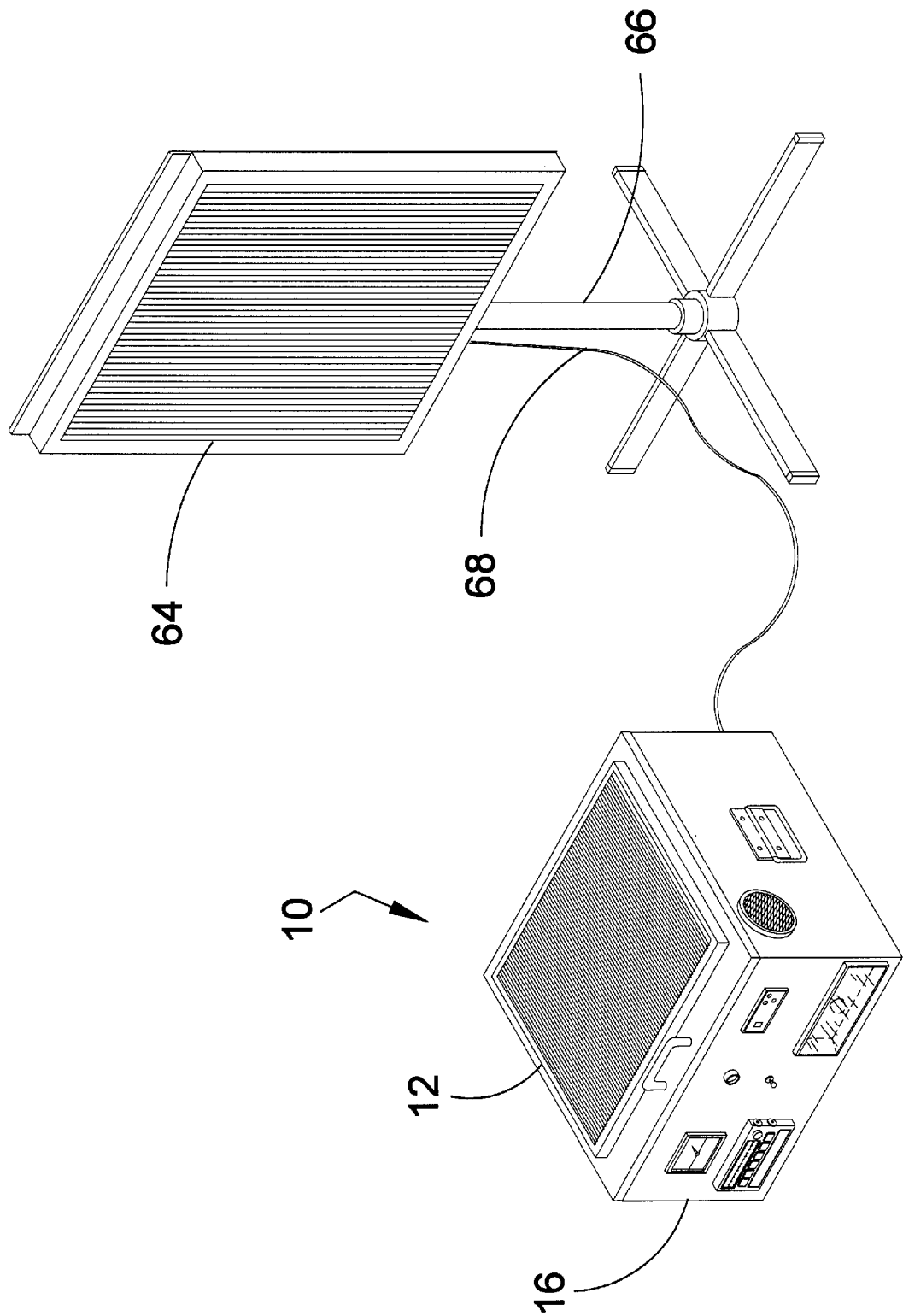
FIG. 8 is a perspective view of the present invention with an external solar panel connected to increase the potential power output. More than one external solar panel can be used to meet greater power demands.

Turning to FIG. 8, shown therein is a perspective view of the present invention 10 with an external solar panel 64 connected to increase the potential power output. More than one external solar panel 64 can be used to meet greater power demands. A stand 66 and electrical connection cord 68 for the solar panel 64 is also shown along with the solar panel 12 and housing 16.

Figure 9:
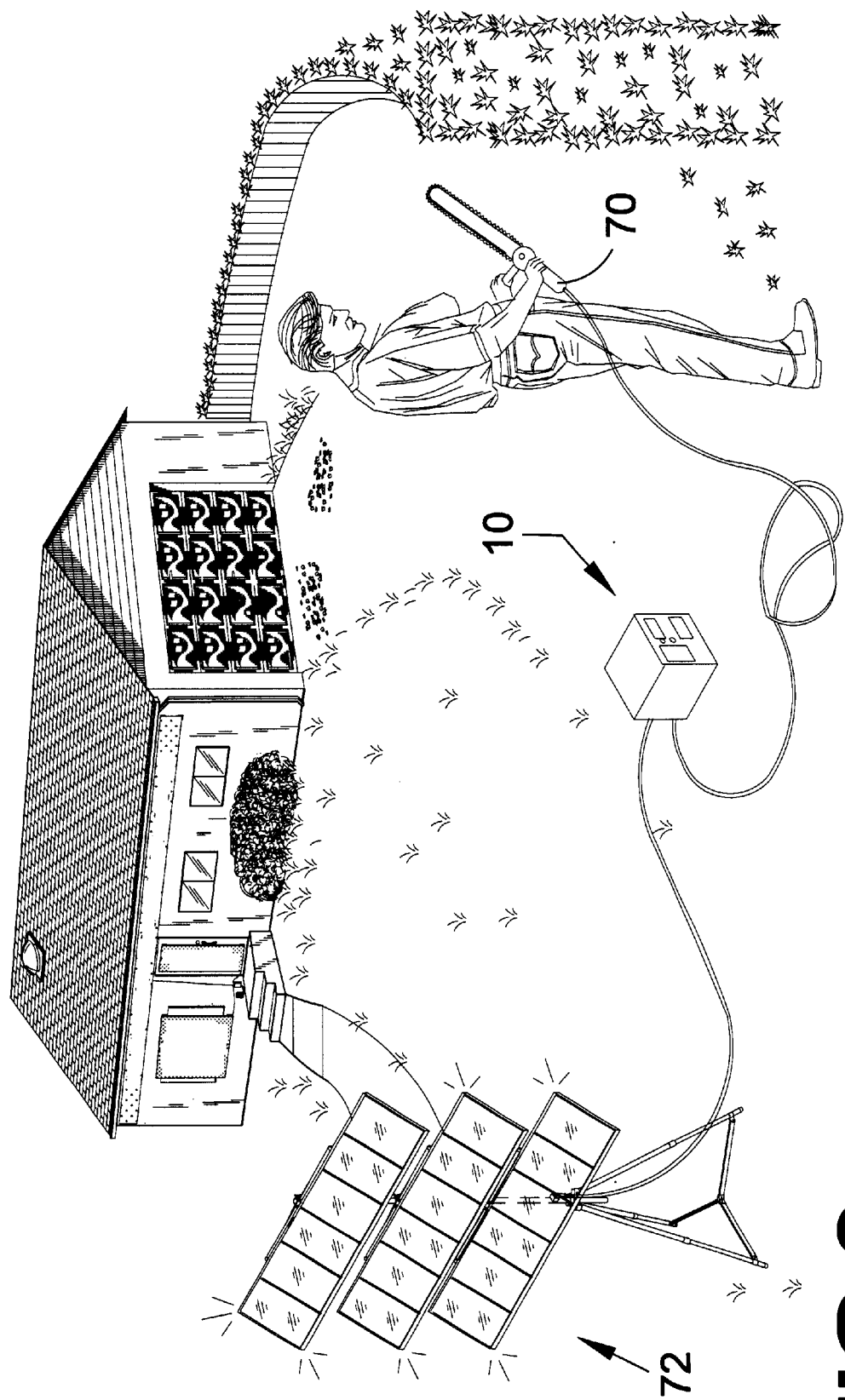
FIG. 9 is a perspective view of the present invention in use to operate an AC dependent power tool utilizing a remote solar array to provide the extra power necessary to operate the power tool. The rechargeable battery will compensate for any deficiency if the power being generated by the solar panels becomes inadequate to meet the power demands of the tool.

Turning to FIG. 9, shown therein is a perspective view of the present invention 10 in use to operate an AC dependent power tool 70 utilizing a remote solar array 72 to provide the extra power necessary to operate the power tool. The rechargeable battery (not shown) will compensate for any deficiency if the power being generated by the solar panels 72 becomes inadequate to meet the power demands of the tool 70.

Figure 10:
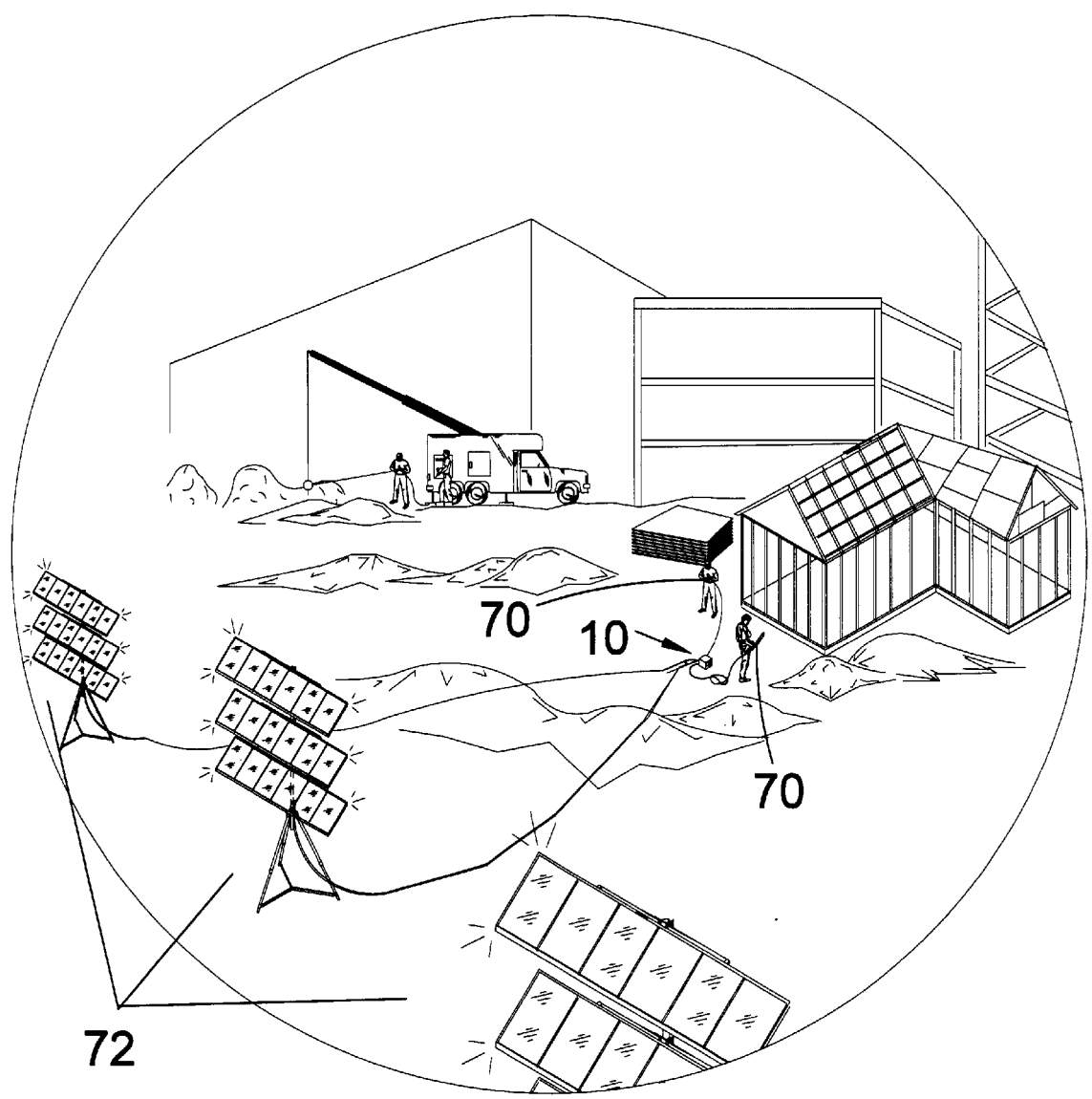
FIG. 10 is a perspective view of the present invention in use to operate more than one power tool thereby requiring a plurality of solar arrays to meet the high power demands. The present invention is particularly helpful when working in areas without electricity and when the noise and fuel demands of a gasoline-operated generator are not desired.

Turning to FIG. 10, shown therein is a perspective view of the present invention 10 in use to operate more than one power tool 70 thereby requiring a plurality of solar arrays 72 to meet the high power demands. The present invention 10 is particularly helpful when working in areas without electricity and when the noise and fuel demands of a gasoline-operated generator are not desired.

Figure 11:
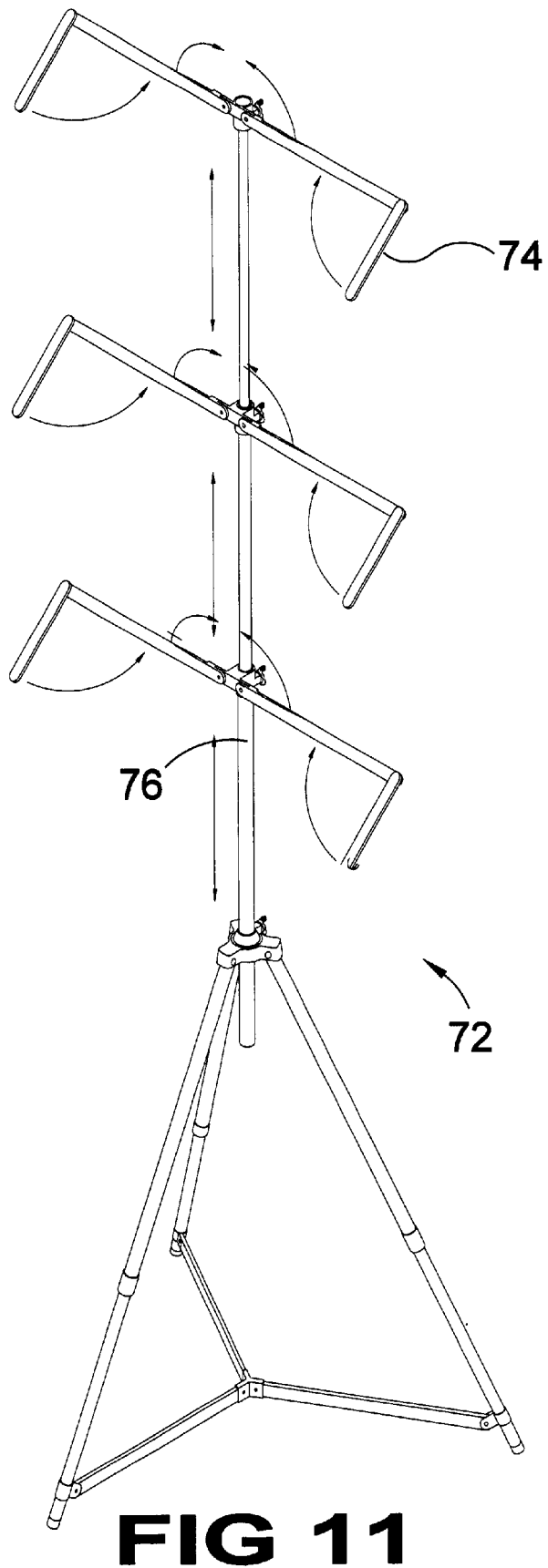
FIG. 11 is a perspective view of the polar array assembly with the solar panels removed. Solar panel support ends are twisted at a 45 degree angle so that the swing down outer support member will tilt the solar panel for more effective solar power generation and conversion. Each telescopic section is offset from the section above it in order to allow each to completely collapse for minimum storage dimensions.

Turning to FIG. 11, shown therein is a perspective view of the solar array 72 assembly with the solar panels removed. Solar panel support ends 74 are turned at a 45 degree angle so that the swing down outer support member will tilt the solar panel for more effective solar power generation and conversion. Each telescopic section 76 is offset from the section above it in order to allow each to completely collapse for minimum storage dimensions.

Figure 12:
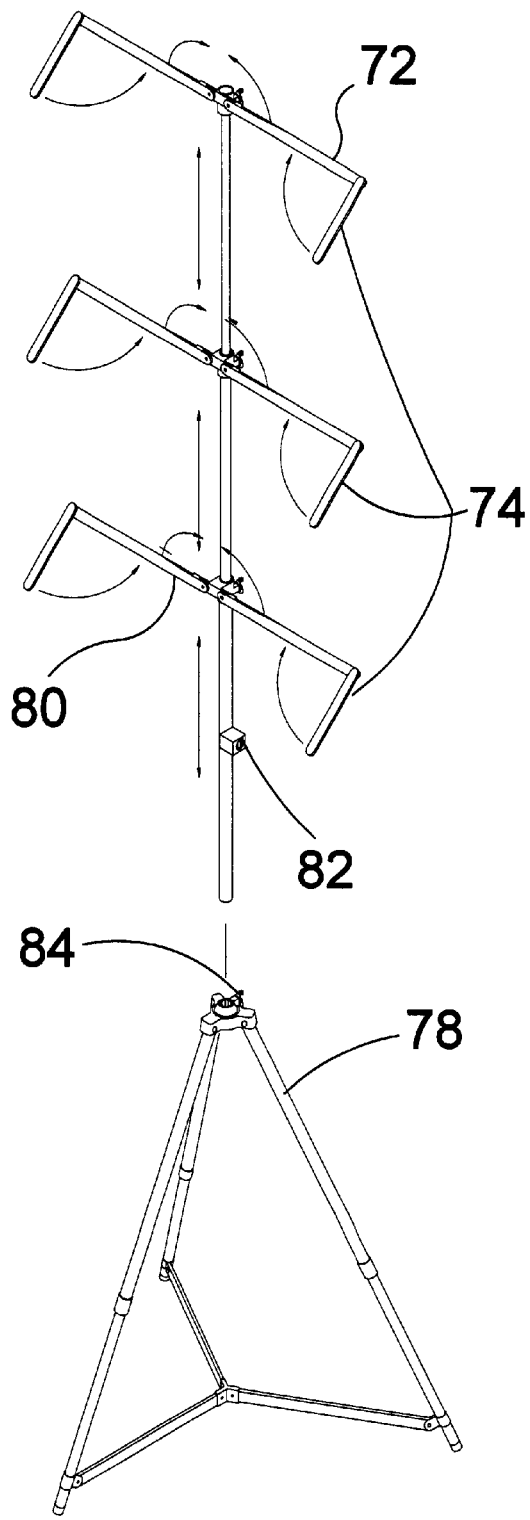
FIG. 12 is an exploded perspective view of the polar array assembly with the solar panels removed showing how the tripod could be removed from the assembly if needed.

Turning to FIG. 12, shown therein is an exploded perspective view of the solar array 72 assembly with the solar panels removed showing how the tripod 78 could be removed from the assembly if needed. Also shown are the adjustable support 80, electrical connection 82 and the clamping device 84.

Figure 13:
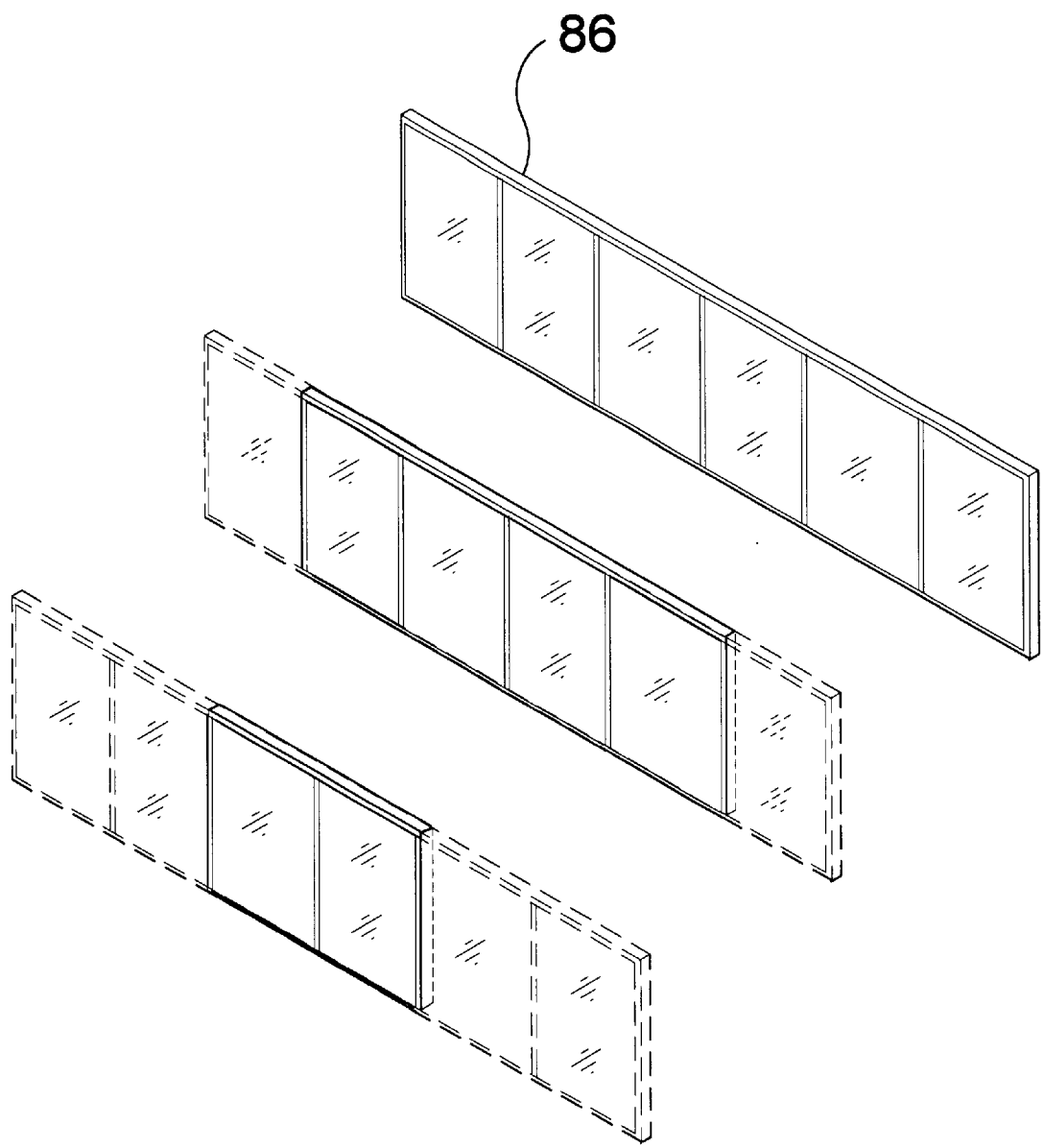
FIG. 13 is a perspective view of the solar panels removed from the polar array assembly.

Turning to FIG. 13, shown therein is a perspective view of the solar panels 86 removed from the solar array assembly showing that the assembly can accommodate a plurality of panels.

What is claimed to be new and desired to be protected by Letters Patent is set forth in the appended claims:

1. An apparatus for a solar powered electrical generator and audio device, comprising:

a) a housing being generally rectangular shaped, said housing defined by a top surface, a bottom surface, a front surface, a rear surface, and a pair of side surfaces, said housing having carrying handles disposed thereon;

b) a first means comprising a solar panel, said solar panel comprising said top surface of said housing, said first solar panel generating DC electricity;

c) means for pivotally connecting said first solar panel to said top of said housing, said solar panel being pivotal along an edge thereof and capable of being raised to an angle to collect solar energy, said solar panel when retracted fully enclosing the top of said housing and when raised exposing the interior of said housing;

d) a CD player disposed in said housing, said CD player having control knobs on a front face thereof, said face disposed on said front of said housing;

e) an audio speaker for said CD player disposed on said housing;

f) a battery disposed internal said housing;

g) a means for recharging said battery to allow excess energy from said solar panel to be used to recharge said battery;

h) means for electrically connecting said solar panel, said CD player, said battery, and said battery recharger, whereby all components of the apparatus are electrically connected, said battery having terminals connected by spring loaded clamps for rapid connection and disconnection;

i) means for electrically controlling the apparatus, whereby all components of the apparatus are electrically controlled;

j) means comprising a DC automobile lighter plug disposed on said housing for providing DC electricity to a proximate device; and k. means in said housing for converting DC to AC for providing AC power to an external device.

2. The apparatus of claim 1, further comprising a voltmeter disposed on said front of said housing to indicate the charge on said battery.

3. The apparatus of claim 2, further comprising an AC outlet disposed on said front of said housing.

4. The apparatus of claim 3, said AC outlet further comprising means for a GFIC installed therein.

5. The apparatus of claim 1, further comprising means providing access to an external solar panel to supplement DC electricity produced by the solar panel forming the top of said housing.

6. The apparatus of claim 5, wherein said external solar panel is mounted on a telescoping stand and said telescoping stand having a base, said base further comprising a tripod.

* * * * *